United States Patent
Tsujimoto et al.

[11] Patent Number: 5,847,811
[45] Date of Patent: Dec. 8, 1998

[54] PHOTOGRAPHIC FILM PROCESSING APPARATUS AND METHOD OF CONTROLLING THE SAME

[75] Inventors: Yoshihiro Tsujimoto; Ryuichi Iwasaki; Kazuyoshi Yamamoto, all of Wakayama, Japan

[73] Assignee: Noritsu Koki Co., Ltd., Wakayama, Japan

[21] Appl. No.: 409,157

[22] Filed: Mar. 23, 1995

[30] Foreign Application Priority Data

Mar. 25, 1994 [JP] Japan .................................. 6-056034
Apr. 6, 1994 [JP] Japan .................................. 6-068556

[51] Int. Cl.⁶ .................................................. G03B 27/52
[52] U.S. Cl. ............................. 355/40; 355/41; 360/53
[58] Field of Search .................................. 354/297, 298; 430/30, 220; 355/40, 41, 42; 360/1, 2, 3, 38.1, 53

[56] References Cited

U.S. PATENT DOCUMENTS

| | | | |
|---|---|---|---|
| 4,413,339 | 11/1983 | Riggle et al. ............................ | 371/38 |
| 4,857,967 | 8/1989 | Naruse et al. ........................... | 355/69 |
| 5,241,546 | 8/1993 | Peterson et al. ....................... | 371/37.1 |
| 5,328,787 | 7/1994 | Clifford et al. ........................ | 430/30 |
| 5,335,029 | 8/1994 | Itoh et al. .............................. | 354/106 |
| 5,344,730 | 9/1994 | Kitmoto ................................. | 430/14 |
| 5,347,403 | 9/1994 | Uekusa .................................. | 360/3 |
| 5,430,276 | 7/1995 | Ohtani et al. .......................... | 235/375 |
| 5,432,570 | 7/1995 | Ueda et al. ............................ | 354/105 |
| 5,452,143 | 9/1995 | Kamagami .............................. | 360/2 |

*Primary Examiner*—R. L. Moses
*Assistant Examiner*—Shival Virmani
*Attorney, Agent, or Firm*—Wenderoth, Lind & Ponack

[57] ABSTRACT

A photographic film processing apparatus has a data reader for reading magnetic data stored in a row of magnetic recorded tracks on a photographic film. The apparatus determines whether a reading error has occurred during film processing. If no error has occurred, then the film is processed in accordance with the magnetic data from the film. If an error has occurred, then the apparatus determines whether the data is eligible for replacement with reference data. If the erroneous data is eligible, then the film is processed in accordance with the reference data. If the erroneous data is not eligible, then the film is processed in accordance with external substitute data which is entered by an operator. Furthermore, the apparatus produces a maintenance demand signal based on the number of reading errors or the total length of photographic film processed.

15 Claims, 7 Drawing Sheets

PHOTOGRAPHIC FILM PROCESSING APPARATUS AND METHOD OF CONTROLLING THE SAME

BACKGROUND OF THE INVENTION

The present invention relates to a method of controlling a processing apparatus for carrying out photographic processing, e.g. printing, actions in accordance with relevant data recorded in magnetic recording tracks on a photographic film.

The present invention also relates to a photographic film processing apparatus for subjecting a photographic film, which carries magnetic recording tracks thereon, to the photographic processing actions.

It is known that magnetic recording tracks M in the form of coatings of a transparent magnetic material are provided on a photographic film or more particularly, negative film 2, as shown in FIG. 6. The magnetic recording tracks M are aligned in a row along the transfer direction of the film for storage of various shooting data (including the date, exposure conditions, and printing requirements) of corresponding images.

During the printing process with such a negative film, shooting data recorded in the magnetic recording tracks M on a photographic film 110 are retrieved with a magnetic read/write head 100 for determining the printing conditions, as shown in FIG. 7. Also, using the magnetic head 100, compensated exposure settings determined with a detector or sensor for producing optimum prints from under- or overexposed images may be recorded in the magnetic recording tracks M.

The compensated exposure settings recorded in the magnetic recording tracks M are then used in a later printing process for reproducing prints of the identical quality.

The problem is that the recorded data in the magnetic recording tracks M tends to be degraded or lost over time due to nonuniformity in feeding of the film, deposition of dirt on the tracks, and intrinsic noise components in the data itself, and will thus be read incorrectly or with difficulty.

For example, as shown in FIG. 7, a grain of dust 120 trapped between the magnetic head 100 and the magnetic recording track M on the photographic film 110 may cause improbable or incorrect identification of the recorded data.

In a commercial camera, the recording of shooting data on the magnetic recording tracks M on a photographic film is not always executed under friendly conditions. For example, a battery unit installed in the camera is too small to maintain a predetermined torque for feeding the film at a constant speed. In general, the photographic film is handled in hostile conditions including hot or cold temperatures, humidity, vibration, and dusty air.

The shooting data recorded during such hostile conditions, or stored for a while in such hostile conditions, is possibly degraded and thus, retrieval of the information will be unlikely or erroneous.

For improvement, the use of error correcting means, e.g. parity check or cyclic redundancy check (CRC), and of error correction codes, e.g. Read-Solomon (RS) coding, according to a theory of data processing has been proposed as depicted in Japanese Patent Laid-open Publication 5-181209 (1993).

However, the use of advanced error correction techniques fails to completely eliminate errors during reading of the shooting data.

It is also difficult for a common camera to perform an advanced data processing action under the limited conditions which are designated by its size, power supply, and cost.

The magnetic heads are worn after a long period of service and thus decline in performance, resulting in erroneous reading of the recorded data from a photographic film.

If such an erroneous reading of the data, e.g. the data designating the size of prints, occurs, the photographic processing actions are interrupted. This will require the operator to correct the data error.

It is thus essential for the operator to perform a series of maintenance actions, including cleaning or replacement of the read and write heads, at a precise time.

The timing for carrying out the maintenance actions to prevent any erroneous reading of the data mostly depends on the skill of the operator.

Different operators have different levels of skill. Thus it will not be easy for an unskilled operator to determine the timing for performing the maintenance. Skilled operators themselves may be deceived by a change in the condition and thus fail to start the maintenance actions in time.

It is an object of the present invention to provide an improved photographic film processing apparatus capable of carrying out the photographic processing actions in accordance with relevant data stored in the magnetic recording tracks on a photographic film without being effected by erroneous reading of the data or physical deterioration of the data over time. It is another object of the present invention to provide a method of controlling the photographic film processing apparatus.

SUMMARY OF THE INVENTION

A photographic film processing apparatus, according to the present invention, has a data reading means for reading magnetic data stored in a row of magnetic recording tracks on a photographic film, a data examining means for examining whether a reading error occurs, and a processing means for carrying out photographic processing actions. The apparatus includes one or more of the following aspects.

A counting means for counting the occurrence of reading errors; and an output means for producing and delivering a maintenance demand signal when the number of reading errors counted by the counting means exceeds a limit value.

A counting means for counting the occurrence of reading errors; an accumulating means for calculating a sum of reading quantities or durations and storing it as an accumulation; a calculating means for calculating a ratio of the number of reading errors to the accumulation; and an output means for producing and delivering a maintenance demand signal when the ratio calculated by the calculating means exceeds a limit value.

An accumulating means for calculating and storing a sum of the total amount of photographic film passing across the data reading means; and an output means for producing and delivering a maintenance demand signal when the sum of the lengths calculated by the accumulating means exceeds a limit value.

A first method of controlling the photographic film processing apparatus includes the steps of: processing the photographic film in accordance with the magnetic data when the data examining means judges that no reading error has occurred; and examining whether or not the magnetic data is eligible for replacement with a predetermined reference data when the data examining means judges that a reading error has occurred; if the data is eligible for replacement, executing the photographic processing actions in accordance with the reference data which has replaced the original magnetic data; and if the data is not eligible, executing the photographic processing actions in accordance with externally input substitute data.

A second method of controlling the photographic film processing apparatus includes the steps of: modifying predetermined criteria for examining the eligibility of the magnetic data, according to the requirements of use; processing the photographic film in accordance with the magnetic data when the data examining means judges that no reading error has occurred; and examining whether the magnetic data is eligible for replacement with predetermined reference data by comparing the magnetic data with the criteria when the data examining means judges that a reading error has occurred; if the data is eligible for replacement, executing the photographic processing actions in accordance with the reference data which has replaced the original magnetic data; and if the data is not eligible, executing the photographic processing actions in accordance with externally input substitute data.

A third method of controlling the photographic film processing apparatus includes the steps of: modifying predetermined reference data according to the requirements of use; processing the photographic film in accordance with the magnetic data when the data examining means judges that no reading error has occurred; and examining whether the magnetic data is eligible for replacement with the predetermined reference data when the data examining means judges that a reading error has occurred; if the data is eligible for replacement, executing the photographic processing actions in accordance with the reference data which has replaced the original magnetic data; and if the data is not eligible, executing the photographic processing actions in accordance with externally input substitute data.

In the photographic film processing apparatus for subjecting a photographic film provided with a row of magnetic recording tracks thereon, to photographic processing actions, the data examining means examines whether a reading error occurs during the reading of relevant data from the corresponding magnetic recording track. More particularly, the data examining means examines whether the data is correctly read or not and if not, the number of reading errors is counted by the counting means.

When the number of reading errors exceeds a predetermined limit value, the output means produces and delivers a maintenance demand signal.

Accordingly, the maintenance demand signal indicates the time for commencing the maintenance action to the operator.

The apparatus could also include accumulating means which calculates a sum of reading quantities or durations and delivers it as the accumulation value. The calculating means then determines a ratio of the reading errors to the accumulation.

When the ratio exceeds a limit value, the output means produces and delivers a maintenance demand signal.

Accordingly, the operator is systematically instructed by the signal to start the maintenance action at this time.

Additionally, a sum of passing lengths of the photographic film across the data reading means provided for reading data from the film could be calculated and stored. When the total passing length exceeds a predetermined limit value, the output means produces and delivers a maintenance demand signal to indicate the time for commencing the maintenance action to the operator.

According to the first control method, relevant data is read by the reading means from the magnetic recording tracks of a photographic film and examined by a parity check action of the data examining means to determine whether it is correct or not.

When the data is correct, it is used for carrying out the photographic processing actions.

When the data is incorrect, the data is further examined to determine whether it is eligible for replacement with reference data. When the data is eligible, the reference data is used for the photographic processing actions.

If the data is not eligible, it is replaced with external data which is then used for performing the processing actions.

The data which is not eligible for replacement with reference data includes data representing print size, flash lighting, back lighting, film loading direction, or a combination of artificial and natural lighting.

According to the second method, the criteria for judgment is modified corresponding to the requirements of use. As a result, the processing actions can be executed at optimum levels with respect to the skill of the operator and the ability of a printing station in the photographic film processing apparatus.

According to the third method, the reference data is modified corresponding to the requirements of use. As a result, the processing actions can be executed at optimum levels with respect to the skill of the operator and the ability of a printing station in the photographic film processing apparatus.

DETAILED DESCRIPTION OF THE PREFERRED EMBODIMENTS

One preferred embodiment of the present invention will be described in the form of a photographic film processing apparatus referring to the accompanying drawings.

Figure 1:
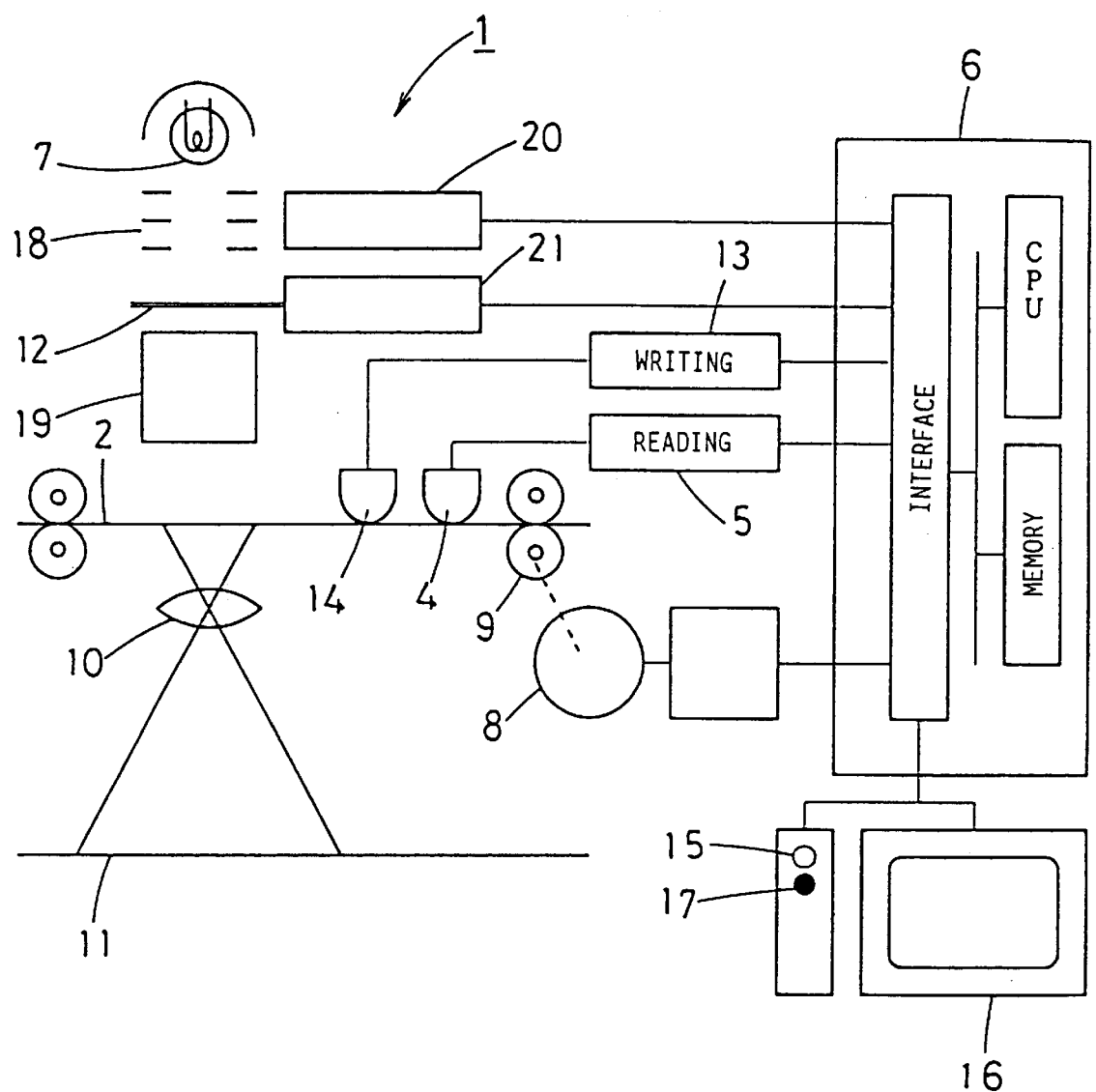
FIG. 1 is a schematic view of a photographic film processing apparatus showing an embodiment of the present invention.

As shown in FIG. 1, the photographic film processing apparatus of the embodiment includes a printing station 1 for subjecting a photographic film to steps of a known printing process. More specifically, a (photographic) negative film 2 prepared by a series of development, fixture, rinsing, and drying actions with an unshown film development apparatus is supplied from its cartridge (not shown).

Figure 6:
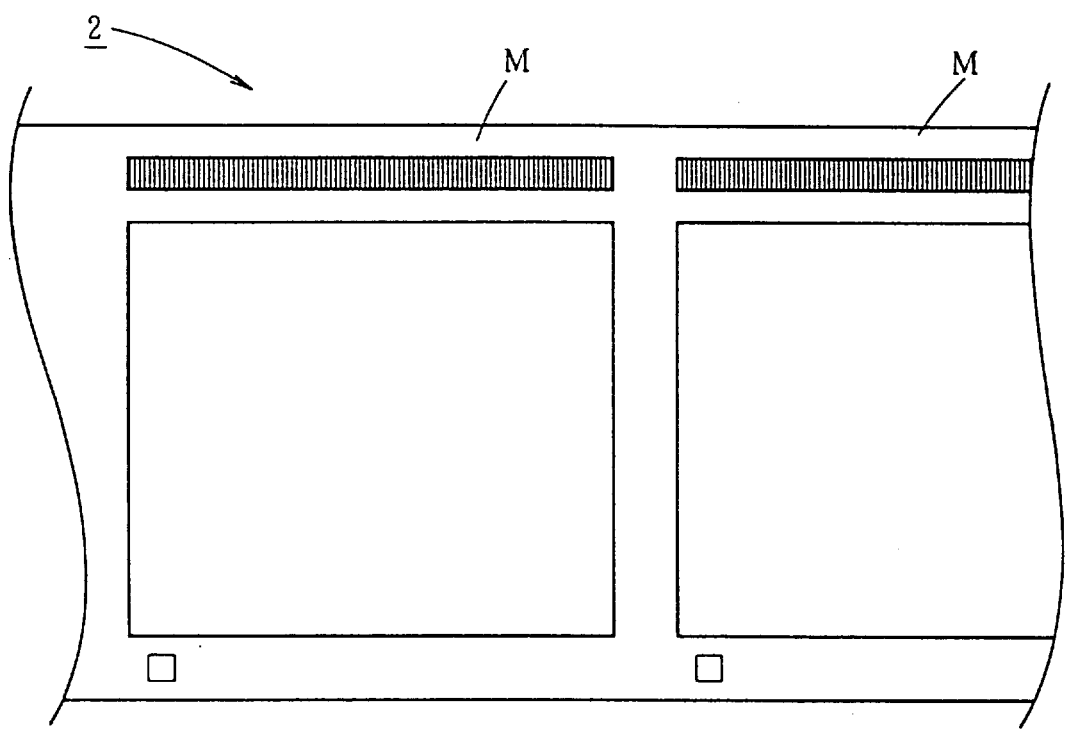
FIG. 6 is a plan view of a photographic film having a row of magnetic recording tracks provided thereon.
Figure 7:
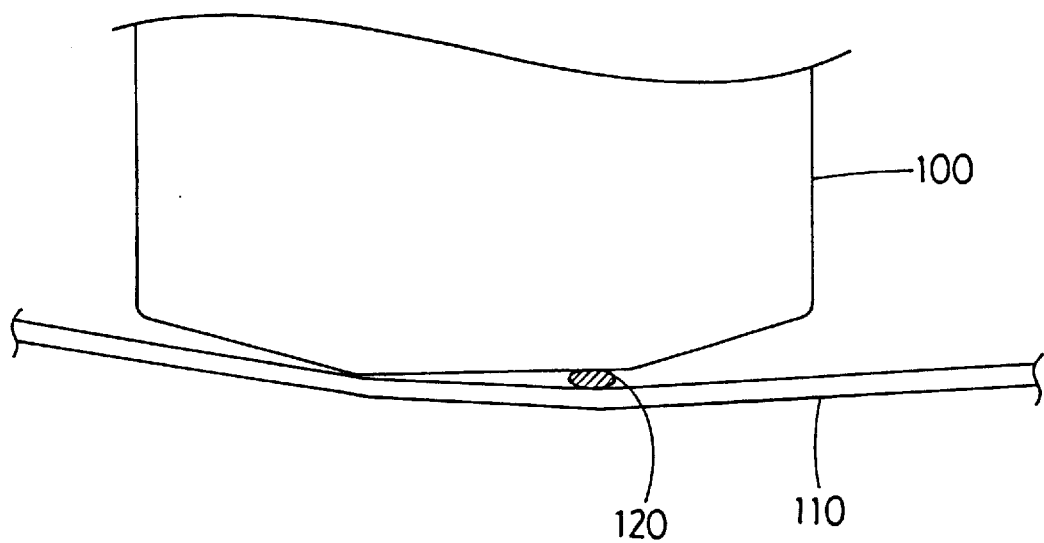
FIG. 7 is an enlarged view showing an interface between a read/write head means and a photographic film.

The negative film 2 has a row of magnetic recording tracks M provided lengthwise in the form of a layer of a magnetic material on one edge thereof as shown in FIG. 6.

In action, as the negative film 2 has been introduced from the cartridge, shooting data in a corresponding one of the magnetic recording tracks on the negative film 2 is read with a magnetic read head 4 and converted into its digital form by a demodulator 5 before being transmitted to a control circuit 6.

In the control circuit 6, the digital data is modified or edited to become printing data including exposure requirements. The resultant printing data is then fed to a modulator 13 for modulation and written with a magnetic write head 14 into the magnetic recording track M on the negative film 2.

The magnetic read head 4 and demodulator 5 constitute data reading means.

The advancing action of the negative film 2 to an exposure location across an optical axis of a light source 7 is carried out by the rotation of drive rollers 9 driven by a motor 8. A beam of light from the light source 7 is irradiated through a YMC filter 18, driven by a filter actuator 20, and a shutter 12, driven by a shutter actuator 21, on to a desired frame image in the negative film 2 which is in turn projected by a lens 10 to a sheet of photosensitive material 11 for printing.

At this time, the movement of the shutter 12 is controlled for optimum exposure with a control signal of the control circuit 6 which has been generated according to the printing data retrieved from the corresponding magnetic recording track M.

The control circuit 6 includes a common control program for control of the printing action and interface circuits provided for connection of the above components to a microcomputer equipped with a maintenance program.

The maintenance program in the microcomputer will now be explained in more detail referring to FIG. 2.

Figure 2:
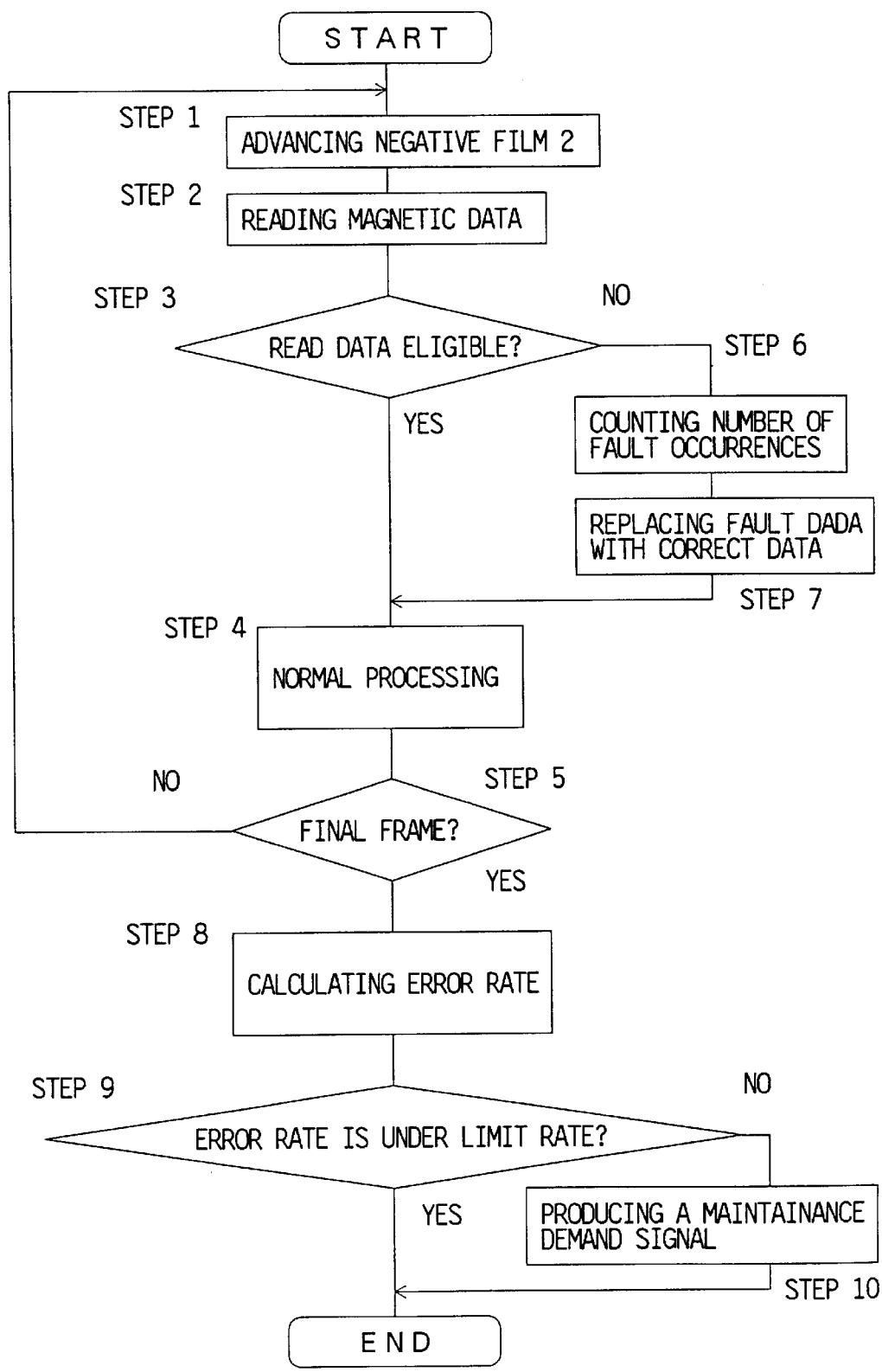
FIG. 2 is a flow chart of a maintenance program for control of the photographic film processing apparatus.

The procedure of FIG. 2 starts with Step 1 where the negative film 2 is advanced from one frame to another by a succession of intermittent actions of the drive rollers 9.

At Step 2, the magnetic recording track M of a target frame on the negative film 2 is accessed by the read head 4 to read corresponding printing data which is then transmitted as the read data via the demodulator or reader 5 to the control circuit 6.

The read data is examined at Step 3, using known parity check or CRC techniques to determine, whether the read data is erroneous or not.

Step 3 represents a data examining means and may be implemented with multistage register means or any other electronic device.

When no error in the read data is found, the procedure goes to Step 4 where the read data is processed with the use of a data table to determine printing data including exposure requirements for controlling the actions of the shutter 12 and the YMC filter 18. Simultaneously, the printing data in digital form is also written by the write head 14 into the magnetic recording track M of the target frame on the negative film 2.

At Step 5, this procedure is repeated until the final frame in the negative film 2 is processed.

If an error in the read data is found at Step 3, the procedure moves to Step 6 for counting the number of reading errors and to Step 7 for replacing the erroneous data with correct data. It is also possible to give a command for entry of substitute data by an operator of the apparatus.

Figure 3:
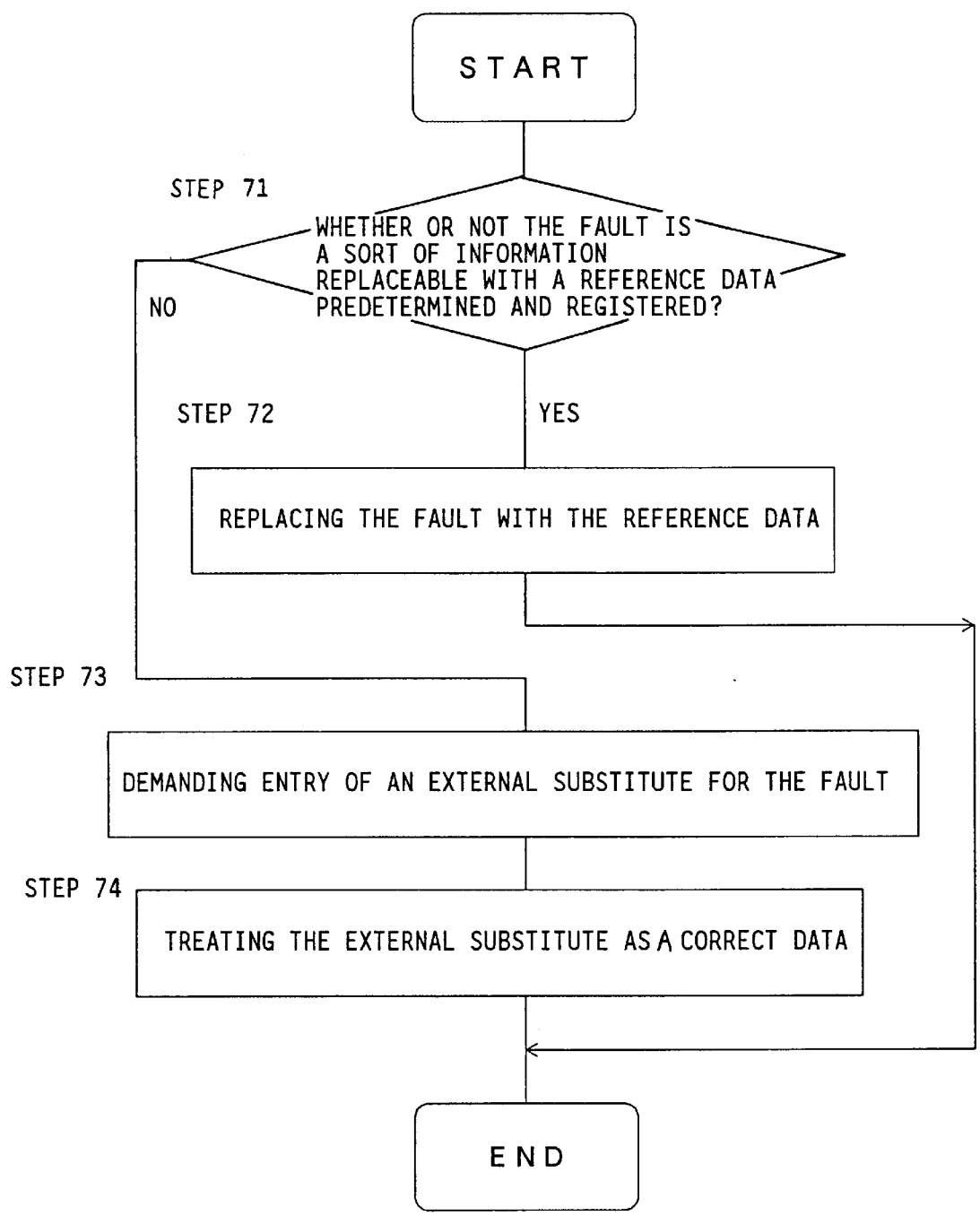
FIG. 3 is a flow chart showing in detail a primary part of the maintenance program of the photographic film processing apparatus.

The action at Step 7 will be explained in more detail referring to FIG. 3.

As an error in the read data is found, predetermined criteria and the header of the read data are examined at Step 71 to determine whether or not the data is the sort of information replaceable with predetermined and registered reference data.

If it is, then the erroneous data is replaced with the reference data at Step 72 and the procedure returns to Step 4.

If it is not, then the procedure goes to Step 73 where the entry of an external substitute for the erroneous data is demanded, and to Step 74 where the external substitute is treated as correct data for replacing the error.

The action of normal processing at Step 4 is initiated with either the reference data or the substitute data.

Step 6 may be implemented with applicable counting means.

After the processing of the final frame is completed, the error rate, which is the ratio of the number of reading errors to a sum of processing quantities determined by a processed distance along the negative film 2, is calculated at Step 8. The error rate is then compared at Step 9 with its predetermined and registered limit. The processing sum may be represented by the length of the film 2 pressed or a total duration of the advanced film. It may also be possible to compare the number of reading error occurrences directly with its limit value.

If the error rate exceeds the limit, the procedure goes to Step 10 where a maintenance demand signal is produced and delivered with the flashing illumination of a maintenance demand lamp 15 or display of a maintenance message on a display 16.

When maintenance is required, the apparatus should be cleaned around the negative film 2 passage and particularly around the magnetic heads 4 and 14.

The action at Step 8 is carried out by a combination of accumulator and calculator means while Steps 9 and 10 are implemented with an output means.

Examples of the examining action at Step 71 will be explained.

The erroneous data can not be replaced with a reference data, when it includes print size data, e.g. L format (89×127 mm), HDTV format (89×128 mm), or panorama format (89×254 mm). Also, it is preferred not to be replaced, when the data is indicative: of the use of a flash or backup light at shooting; of the direction of film loading; or of a combination of both artificial light and sun light. The data is replaceable if it carries information such as the date of shooting, the model or type of camera, the type or kind of lens, the focusing distance to an object, the shutter speed, the aperture information, the film sensitivity, or the frame number.

The microcomputer in the control circuit 6 contains a head replacement program for determining the need for head replacement.

Figure 4:
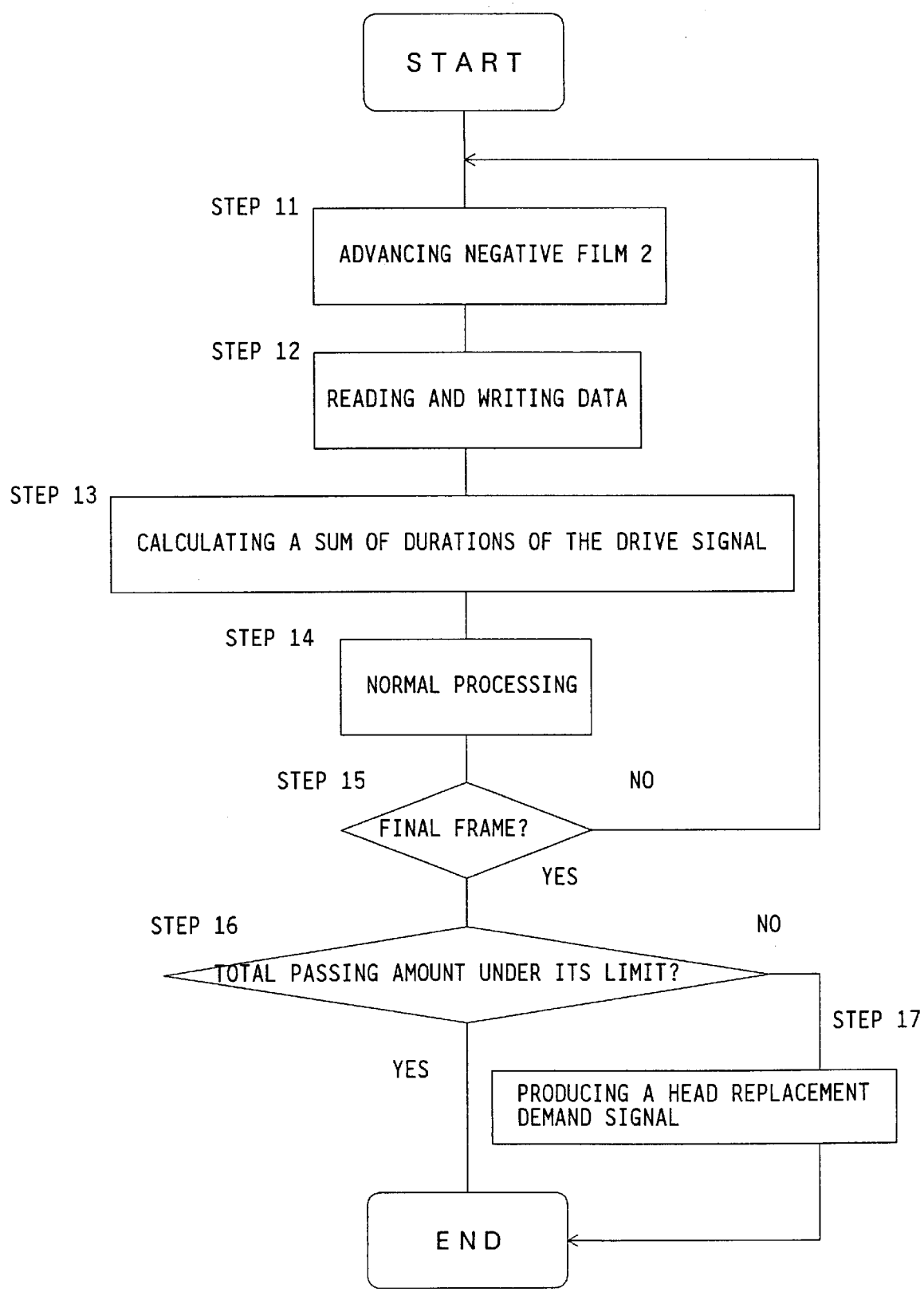
FIG. 4 is a flow chart of a head replacement program for control of the photographic film processing apparatus.

The replacement program will now be explained referring to FIG. 4.

The program starts with Step 11 where the negative film 2 is forwarded by one frame through the intermittent action of the drive rollers 9 executed by the motor 8.

At Step 12, the magnetic recording track M of a target frame on the negative film 2 is accessed by the read head 4 or write head 14 for data acquisition.

Then, a sum of durations of the drive signal fed to the motor 8 is calculated at Step 13.

This action is followed by a routine printing action at Step 14.

At Step 15, the printing action is repeated until the final frame of the negative film 2 is processed.

At Step 16 the total or accumulation of passing amounts, which is determined by the sum of the durations measured at Step 13, is examined to determine whether it exceeds its limit.

If the total passing amount exceeds the limit, a head replacement demand signal is produced and delivered at Step 17 for triggering the flashing illumination of a head replacement demand lamp 17 or displaying a message of the need for head replacement on the display 16.

Upon the replacement of the head being required, both the heads 4 and 14 should be replaced with new ones while the cleaning of the film passage is carried out.

Step 13 is implemented by an accumulating means while Steps 16 and 17 are implemented by an output means.

The passing amount may be calculated by the accumulating means from a total number of processed negative films; from a total measured length of processed negative films; or from the sum of the drive signal durations for the motor 8.

The data examining means for examining whether the data read from the magnetic recording tracks M is correct or not is generally implemented with a known parity check or CRC technique and if possible, with any appropriate error correction encoding method.

The arrangement of the magnetic recording tracks M on the film 2 is not limited to that shown in FIG. 6 but may be made in any other pattern or positions.

As set forth above, the control circuit 6 determines the best time for maintenance from a calculation of the number and frequency of reading errors and instructs the operator to commence the maintenance action. Accordingly, the apparatus of the present invention allows any unskilled operator to carry out the maintenance action in a qualified manner without difficulty.

Also, the timing of replacing the magnetic read and write heads with new ones is precisely determined and indicated by the control circuit 6. Accordingly, any unskilled operator of the apparatus can perform the replacement of the heads while being systematically instructed by an accurate program.

The limit values of the number, ratio, and amount for judgment may arbitrarily be decided depending on the environmental conditions around the apparatus.

The maintenance demand signal may be a signal for instructing the need for cleaning around the read and write heads 4 and 14 or of replacing the same with new ones.

The photographic film processing apparatus of the present invention is not limited to the printing apparatus but may be a film development apparatus, a pre-development apparatus, or any other relevant apparatus.

Although the control circuit 6 of the embodiment comprises a microcomputer with programs including the data examining means, counting means, output means, accumulation means, and calculating means, it may be composed of electronic registers, counters, subtracters, and dividers.

Figure 5:
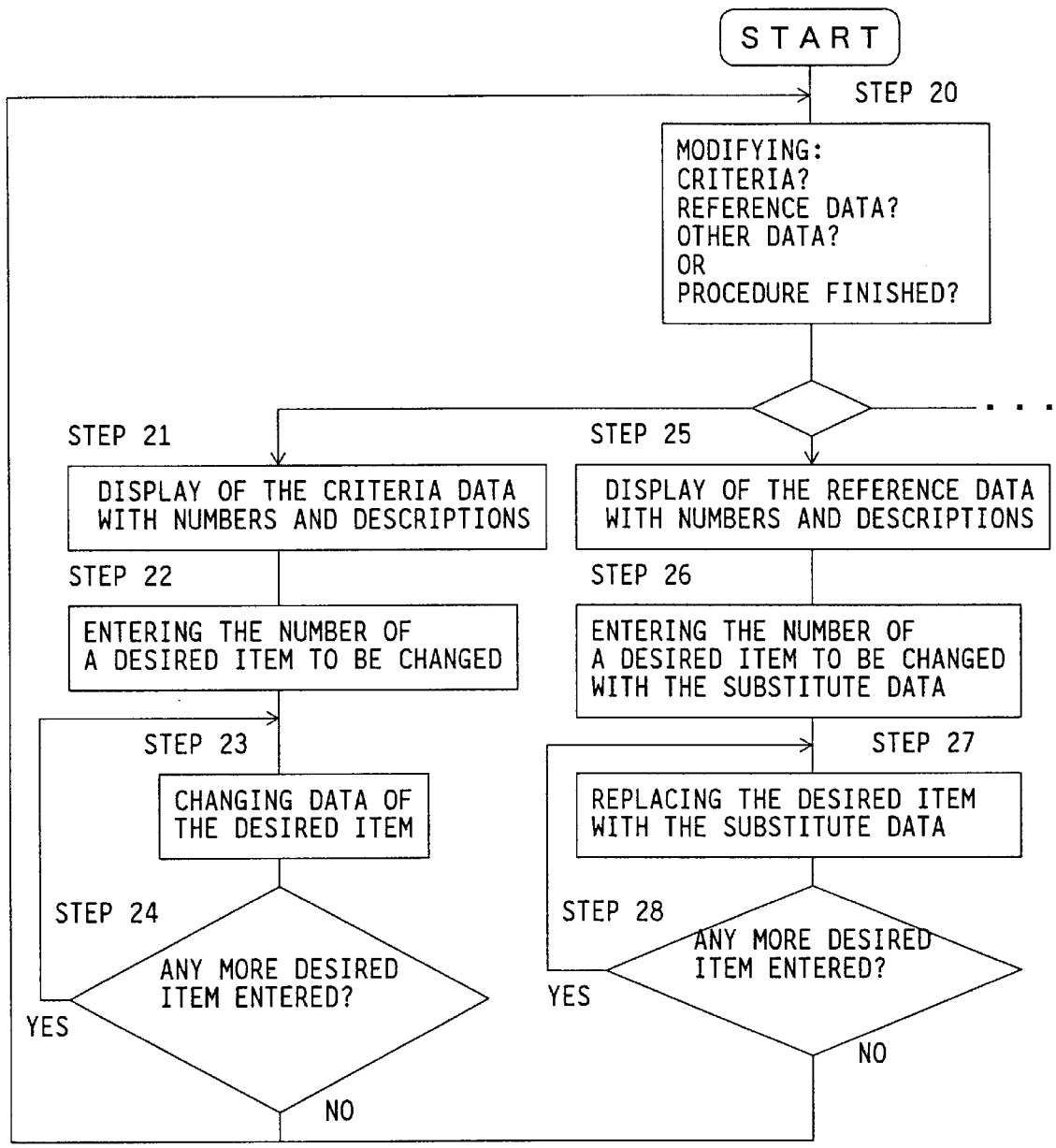
FIG. 5 is a flow chart of a shift program for control of the photographic film processing apparatus.

For modification of the predetermined criteria and reference data, a shift program is used, as shown in FIG. 5, separately of the control program.

The action of the shift program will now be explained.

The shift program starts with Step 20 where it is determined whether the criteria, reference data, or other data is to be modified and whether or not the procedure is finished.

If the criteria is selected for modification at Step 20, the procedure goes to Step 21 for display of details of the criteria data including a list of check items with their numbers and descriptions.

The number of a desired item to be changed is then entered at Step 22.

At Step 23, data of the desired item is changed by rewriting.

If another desired item is to be changed, its number is entered at Step 24 to repeat the action of Step 23.

When no more items are desired, the procedure returns to Step 20.

If a change of the reference data is required at Step 20, the procedure goes to Step 25 for display of details of the reference data including a list of reference items with their numbers and descriptions.

The number of a desired item to be changed is then entered together with the substitute data at Step 26.

At Step 27, data of the desired item is replaced with the substitute data.

If another desired item is to be changed, its number and substitute data are entered at Step 28 to repeat the action of Step 27. Alternatively, Step 28 may only allow entry of "yes" or "no" regarding the desire to change another item.

When no more items are desired, the procedure returns to Step 20.

If the modification of the other data is requested at Step 20, the procedure goes to a subroutine (not shown) for carrying out a similar procedure before returning to Step 20.

Upon the end of the procedure being demanded at Step 10, the main procedure shown in FIG. 2 is terminated.

As set forth above, the criteria is examined to determine whether or not data to be replaced is eligible for rewriting. If it is eligible, it is replaced with reference data while the steps of the photographic processing action are not interrupted, thus increasing the overall processing speed. If the data is not eligible, entry of its correct form is requested and subjected to the data processing, thus contributing to a decrease of erroneous printing actions.

Printing data including exposure requirements which have been used for the current printing action are recorded into the corresponding magnetic recording tracks M on a negative film and can be retrieved during any other printing action. This allows printing of a given image to always be performed under the same conditions, thus producing prints of a uniform quality.

The criteria and reference data are arbitrarily modified, if desired. Hence, they can be consistently processed in an optimum manner when they have been modified to match the skill of an operator of the apparatus 1 or to meet the requirements of a specific printing apparatus to be used.

The method of controlling the photographic film processing apparatus according to the present invention is illustrative and not limitative and may be applied to any negative film processing apparatus.

After being edited with the control circuit 6, the digital data, including exposure requirements for optimum printing, is converted by modulation at the modulator 13 to a write signal, which is then written by the write head 14 onto the corresponding magnetic recording track M of the negative film 2.

What is claimed is:

1. A photographic film processing apparatus comprising:

data reading means for reading recorded data stored in a recording track on a photographic film;

processing means for processing the photographic film in accordance with the recorded data read by said data reading means;

data examining means for determining whether a data reading error has occurred;

counting means for counting the number of reading errors; and output means for producing a maintenance demand signal based on the number of reading errors.

2. The photographic film processing apparatus as set forth in claim 1, wherein said output means produces a maintenance demand signal when the number of reading errors exceeds a predetermined limit.

3. The photographic film processing apparatus as set forth in claim 1, further comprising:

accumulating means for calculating a sum of durations of a drive signal fed to a film driving motor and storing the sum as an accumulation; and calculating means for calculating a ratio of the number of reading errors to the accumulation;

wherein said output means produces a maintenance demand signal when the ratio calculated by said calculating means exceeds a predetermined limit.

4. The photographic film processing apparatus as set forth in claim 1, further comprising:

accumulating means for calculating a total length of processed film and storing the total as an accumulation; and calculating means for calculating a ratio of the number of reading errors to the accumulation;

wherein said output means produces a maintenance demand signal when the ratio calculated by said calculating means exceeds a predetermined limit.

5. A photographic film processing apparatus comprising:

processing means for processing photographic film;

data reading means for reading recorded data stored in a recording track on the photographic film;

accumulating means for calculating and storing a sum of a total length of photographic film processed by said processing means; and output means for producing a maintenance demand signal when the sum of the total length of photographic film calculated by said accumulating means exceeds a predetermined limit.

6. A method of controlling a photographic film processing apparatus, said method comprising the steps of:

reading recorded data stored in a recording track on a photographic film;

examining the recorded data to determine whether a reading error has occurred;

processing the film in accordance with the recorded data when no reading error has occurred;

examining predetermined criteria and the recorded data to determine whether the recorded data is eligible for replacement with predetermined reference data when a reading error has occurred;

processing the film in accordance with the predetermined reference data when a reading error has occurred and the recorded data is eligible for replacement with the predetermined reference data; and processing the film in accordance with externally input substitute data when a reading error has occurred and the recorded data is not eligible for replacement with the predetermined reference data.

7. The method as set forth in claim 6, further comprising the step of modifying the predetermined criteria.

8. The method as set forth in claim 6, further comprising the step of modifying the reference data.

9. A photographic film processing apparatus comprising:

processing means for processing photographic film;

data reading means for reading recorded data stored in a recording track on the photographic film;

data examining means for determining whether a data reading error has occurred;

counting means for counting the number of reading errors;

accumulating means for calculating a total amount of photographic film passing across said data reading means and storing the total as an accumulation;

calculating means for calculating a ratio of the number of reading errors to the accumulation;

output means for producing a maintenance demand signal when the ratio calculated by said calculating means exceeds a predetermined limit; and control means for controlling said apparatus to process the photographic film in accordance with the recorded data when no reading error has occurred, and for examining predetermined criteria and the recorded data to determine whether the recorded data is eligible for replacement with predetermined reference data when a reading error has occurred, and for controlling said apparatus to process the photographic film in accordance with the predetermined reference data when a reading error has occurred and the recorded data is eligible for replacement with the predetermined reference data, and for controlling said apparatus to process the photographic film in accordance with externally input substitute data when a reading error has occurred and the recorded data is not eligible for replacement with the predetermined reference data.

10. The apparatus as set forth in claim 9, wherein the total amount of photographic film passing across said data reading means is calculated from a total number of processed photographic films.

11. The apparatus as set forth in claim 9, wherein the total amount of photographic film passing across said data reading means is calculated from a total measured length of processed photographic films.

12. The apparatus as set forth in claim 9, wherein the total amount of photographic film passing across said data reading means is calculated from a total duration of reading by said data reading means.

13. A photographic film processing apparatus comprising:

data reading means for reading recorded data stored in a recording track on a photographic film;

processing means for processing the photographic film;

data examining means for determining whether a data reading error has occurred;

counting means for counting the number of reading errors;

output means for producing a maintenance demand signal based on the number of reading errors; and control means for controlling said processing apparatus to process the photographic film in accordance with the recorded data when no reading error has occurred and for controlling said processing apparatus to process the photographic film in accordance with a substitute data when a reading error has occurred.

14. The photographic film processing apparatus as set forth in claim 13, wherein said output means produces a maintenance demand signal when the number of reading errors exceeds a predetermined limit.

15. A photographic film processing apparatus comprising:

data reading means for reading recorded data stored in a recording track on a photographic film;

processing means for processing the photographic film;

data examining means for determining whether a data reading error has occurred;

counting means for counting the number of reading errors;

output means for producing a maintenance demand signal when the number of reading errors exceeds a predetermined limit; and control means for controlling said processing apparatus to process the photographic film in accordance with the recorded data when no reading error has occurred, for controlling said processing apparatus to process the photographic film in accordance with a substitute data when a reading error has occurred, and for controlling said processing apparatus to continue processing the photographic film even when the number of reading errors exceeds the predetermined limit.

* * * * *